(12) United States Patent  
Chang

(10) Patent No.: US 8,075,399 B2  
(45) Date of Patent: Dec. 13, 2011

(54) HANDHELD GAME CONSOLE HAVING ASSEMBLED AND DISASSEMBLED MODES

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 505 days.

(21) Appl. No.: 12/341,339

(22) Filed: Dec. 22, 2008

(65) Prior Publication Data

US 2009/0312098 A1    Dec. 17, 2009

(30) Foreign Application Priority Data

Jun. 11, 2008    (CN) .......................... 2008 1 0302106

(51) Int. Cl.  
*A63F 13/00*    (2006.01)

(52) U.S. Cl. ......................................................... 463/35

(58) Field of Classification Search ................... 463/30, 463/35, 39  
See application file for complete search history.

(56) References Cited

U.S. PATENT DOCUMENTS

2008/0316116 A1*    12/2008    Hobson et al. ................ 343/702

OTHER PUBLICATIONS

"Hands-On with the Wii Controller", posted May 12, 2006.*

* cited by examiner

*Primary Examiner* — Thomas L Dickey  
(74) *Attorney, Agent, or Firm* — Altis Law Group, Inc.

(57) ABSTRACT

A game console includes a console main body and at least one game controlling device for inputting commands to the console main body. The at least one game controlling device is configured for selectively operating in an assembled mode where the at least one game controlling device is mechanically and communicatively coupled to the console main body, or in a dissembled mode where the at least one game controlling device is detached from the console main body and is communicatively coupled to the console main body.

20 Claims, 4 Drawing Sheets

HANDHELD GAME CONSOLE HAVING ASSEMBLED AND DISASSEMBLED MODES

BACKGROUND

1. Technical Field

The present disclosure relates to game device, particularly to a portable game console.

2. Description of Related Art

Handheld game consoles are handheld game consoles for playing video games. Since the first true handheld game console were sold and distributed by Milton-Bradley in 1979, handheld game consoles have become enormously popular in the world.

A typical handheld game console is a single unit including a plurality buttons, a screen, and a speaker. The handheld game console has a game program integrated therein. The screen is adapted for displaying content of the game program, and the speaker is configured for representing sound effect of the game program. Player can operate the buttons to control the process of the game program via views of the screen, while enjoying sound effects from the speaker. However, because a player must operate the buttons with hands so near to each other, the player hands will become fatigued. And if a player should play with one hand, again he will become fatigued but now because of the weight of the machine.

What is needed, therefore, is handheld game console which can overcome the above-described problem.

BRIEF DESCRIPTION OF THE DRAWINGS

Many aspects of the present game console can be better understood with reference to the following drawings. The components in the drawings are not necessarily drawn to scale, the emphasis instead being placed upon clearly illustrating the principles of the present embodiment. Moreover, in the drawings, like reference numerals designate corresponding parts throughout the several views.

DETAILED DESCRIPTION

An embodiment will now be described in detail below and with reference to the drawings.

Figure 1:
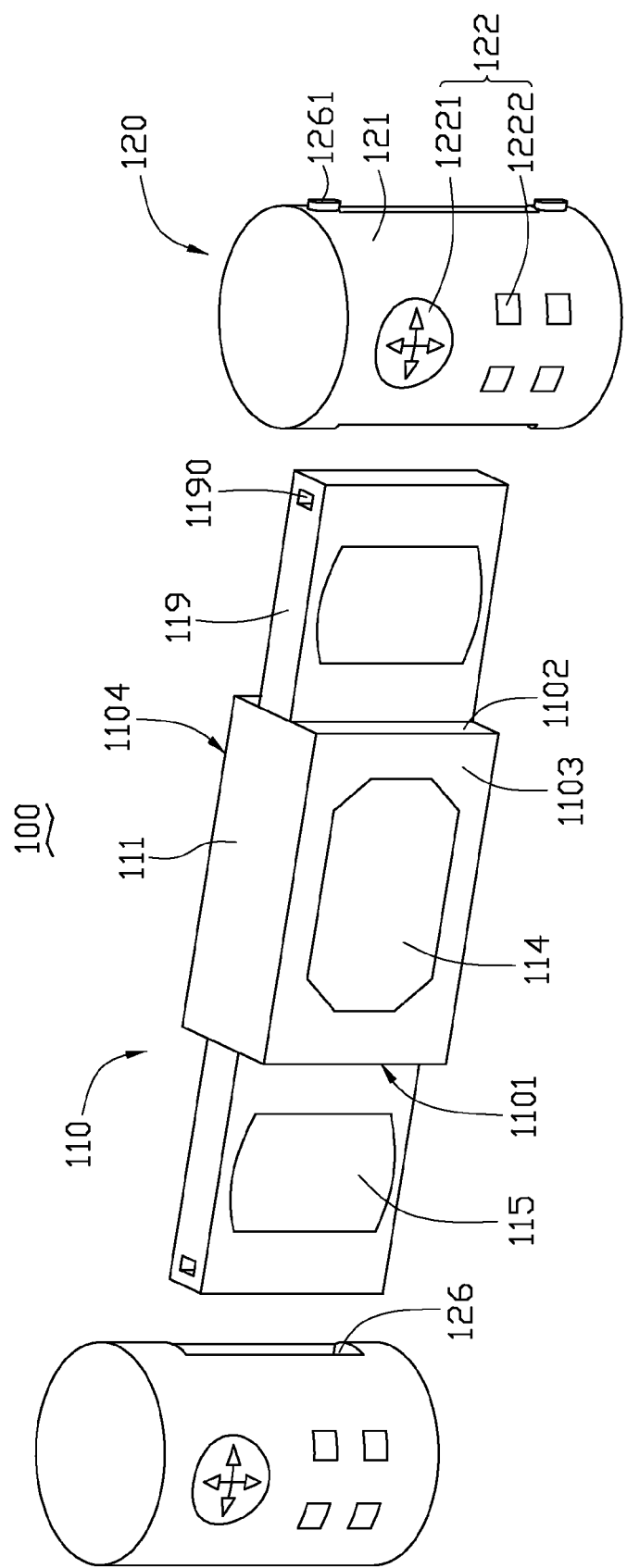
FIG. 1 is a schematic view of a handheld game console, which includes a main body and two game controlling devices according to an exemplary embodiment, in a dissembled mode.
Figure 2:
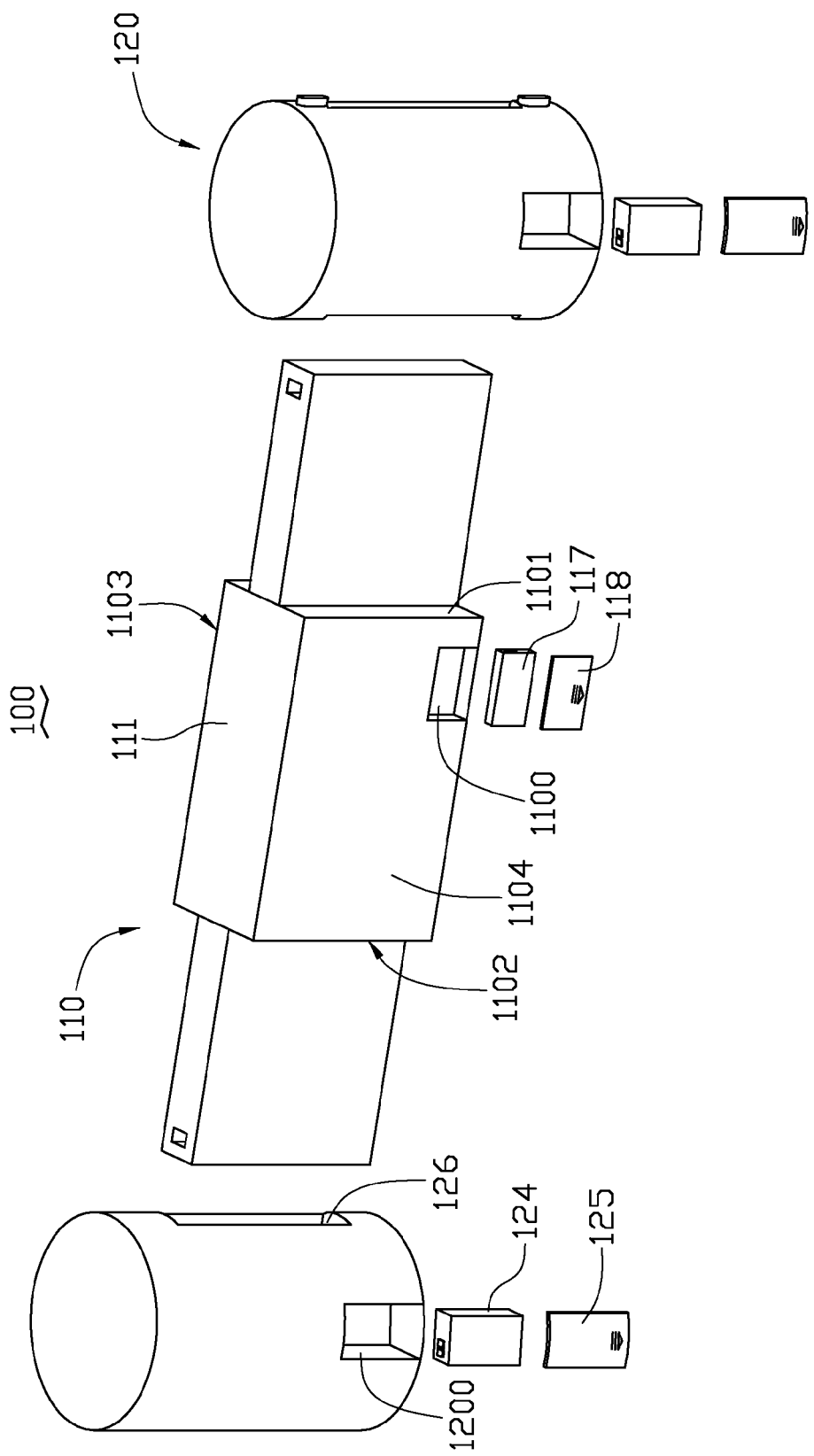
FIG. 2 is similar to FIG. 1, but showing another view of the handheld game console.
Figure 3:
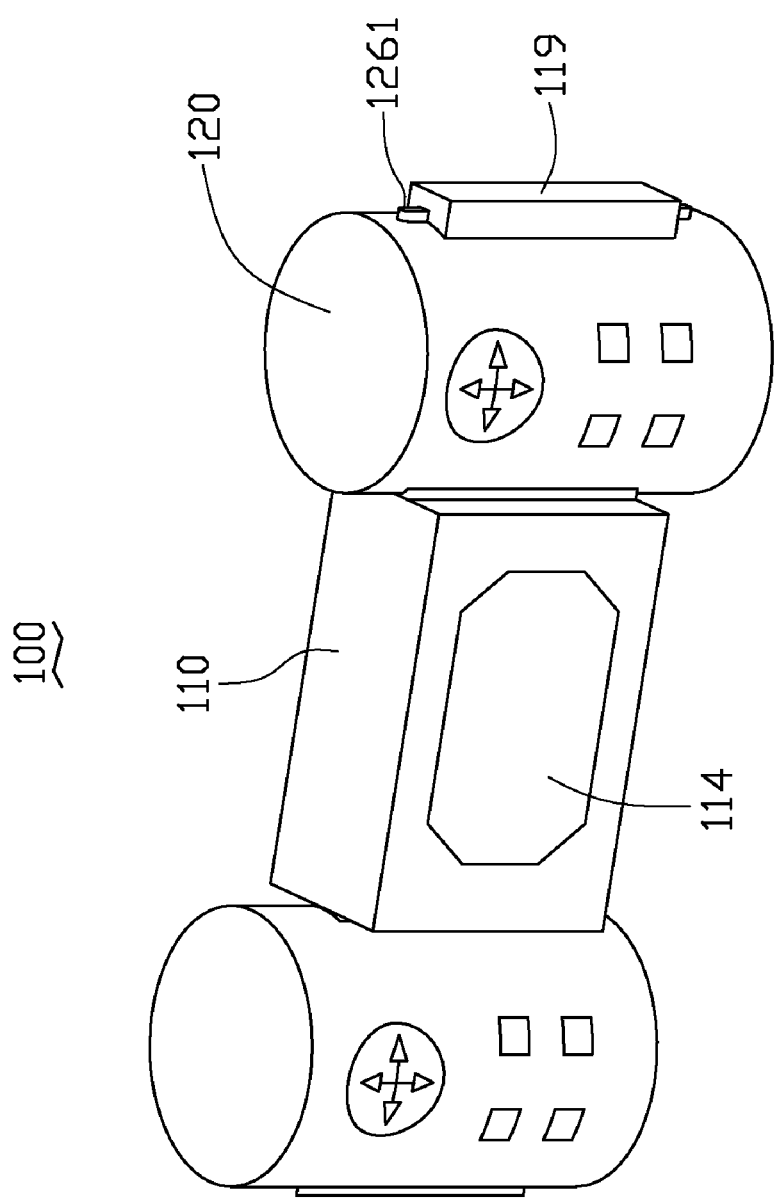
FIG. 3 is similar to FIG. 1, but showing the handheld game console being in an assembled mode.
Figure 4:
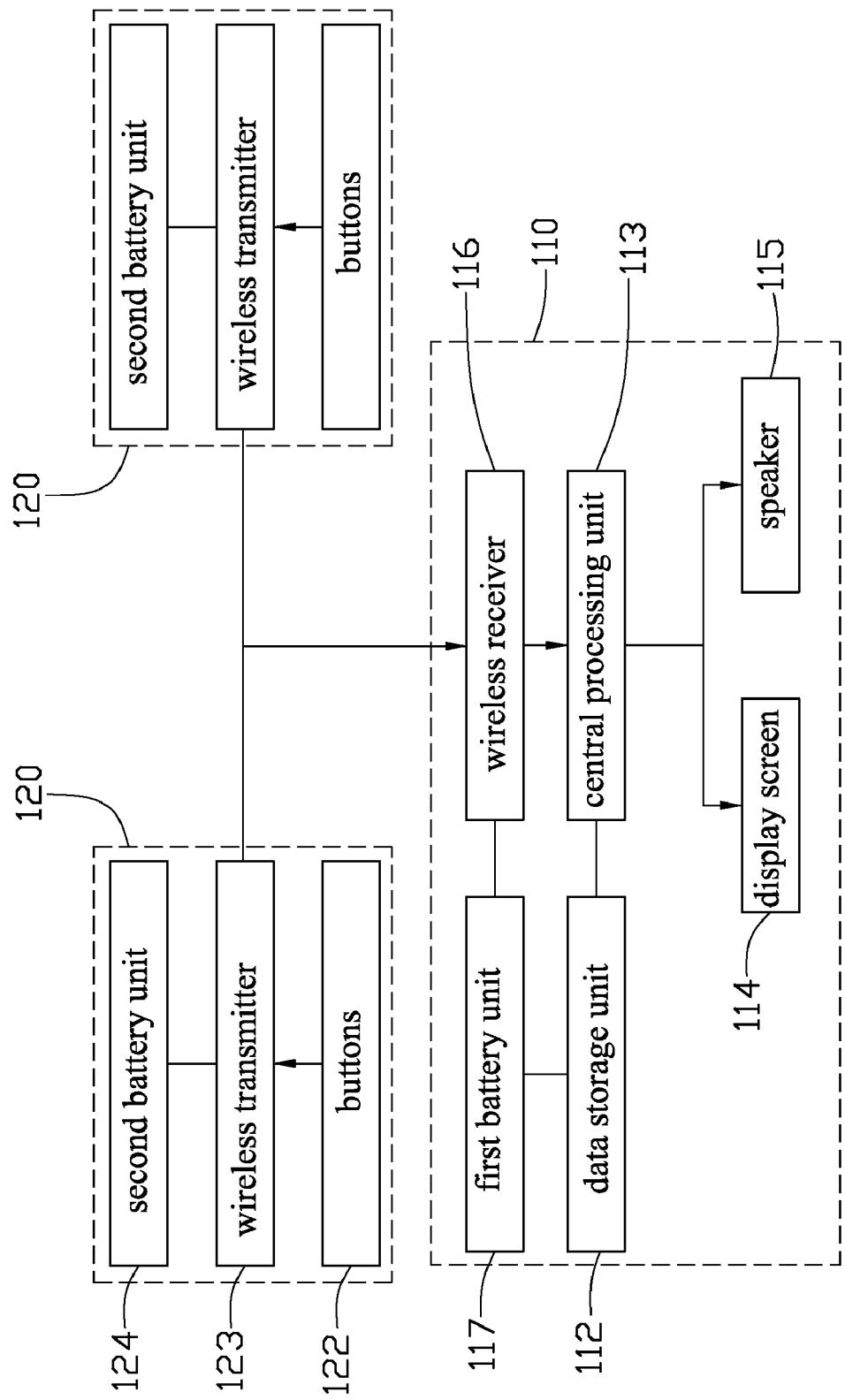
FIG. 4 is a block diagram of the handheld game console of FIG. 1.

Referring to FIGS. 1-3, an exemplary embodiment of a handheld game console 100 includes a console main body 110 and two game controlling devices 120. The console main body 110 has at least one game program stored therein. The game controlling devices 120 are configured for players to input commands to control processes of the at least one game program in the console main body 110. The console main body 110 and the game controlling devices 120 can be connected and communicated by an electrically conductive wire or by a wireless network.

In the present embodiment, the console main body 110 includes a housing 111, a data storage unit 112, a central processing unit 113, a display screen 114, two speakers 115, a wireless receiver 116, a first battery unit 117 and a first cover 118. The housing 111 has a shape of a rectangle, and has a first side surface 1101, a second side surface 1102, a front surface 1103 connected between the first side surface 1101 and the second side surface 1102, and a back surface 1104 opposite to the front surface 1103. The back surface 1104 defines a recess 1100 to receiving the first battery unit 117. The data storage unit 112 is configured to storing a plurality of game programs therein. The central processing unit 113 is configured for processing the game programs according to commands of players, changing the processes of the game programs stored in the data storage unit 112, and controlling the display unit 114 and the speakers 115 according to the processes of the game programs. The data storage unit 112 and the central processing unit 113 are received in the housing 111. The display screen 114 is defined in the front surface 1103 of the housing 111 and is adapted for displaying images of the game programs. The speakers 115 are configured to emit sound effects of the game programs, can be disposed in any surface of the housing 111. The wireless receiver 116 is used for receiving wireless signals from the game controlling devices 120, converting the wireless signals into electronic signals, and transmitting the electronic signals to the central processing unit 113. The wireless receiver 116 is also received in the housing 111. The first battery unit 117 is configured to supply power for the data storage unit 112, the central processing unit 113, the display screen 114, the speakers 115, and the wireless receiver 116. The first cover 118 is cooperated with the housing 111 to cover the recess 1100, thus, the first battery unit 117 in the recess 1100 can be protected. The first cover 118 can have a ribbed area configured for players conveniently assembling the first cover 118 onto the housing 111.

The console main body 110 has two engaging protrusions 119 configured for cooperating with the game controlling devices 120. The two engaging protrusions 119 are rectangular, and extend from two opposite sides of the console main body 110. In detail, one of the engaging protrusions 119 extends from the first side surface 1101, another extends from the second side surface 1102. In the illustrated embodiment, two speakers 115 are disposed in the two engaging protrusions 119 respectively. It is noted that each of the engaging protrusions 119 is not limited to being rectangular, other shapes may be adopted as desired.

The game controlling devices 120 are each cylindrical, and have a shell 121, a number of buttons 122, a wireless transmitter 123, a second battery unit 124, and a second cover 125. The buttons 122 are provided on a front surface of the shell 121 and include a number of direction buttons 1221 and a number of function buttons 1222, which are configured for players to input commands. The wireless transmitter 123 is received in the shell 121 and is configured for converting the commands of the player on the buttons 122 to wireless signals and transmitting the wireless signals to the wireless receiver 116 of the console main body 110. The second battery unit 125 is received in a recess 1200 which is defined in a back surface of the shell 121, opposite to the buttons 122. The second battery unit 125 can be a battery, and is used for supplying power to the wireless transmitter 123. The second cover 125 is cooperated with the shell 121 to cover the recess 1200, thus, the second battery unit 125 in the recess 1200 can be protected. The second cover 125 can have a ribbed area for players conveniently assembling the second cover 125 onto the shell 121 too.

Each of the game controlling devices 120 has a slot 126 penetrated through the shell 121. The slots 126 each correspond to the engaging protrusions 119. Thus, one engaging protrusion 119 of the console main body 110 can pass through and fit into one game controlling device 120, while another engaging protrusion 119 can pass through and fit into another game controlling device 120, and thereby the game controlling devices 120 are assembled and engaged with the console main body 110.

Thus, the handheld game console 100 has two modes, i.e., an assembled mode and a disassembled mode. In the assembled mode, the two game controlling devices 120 are mechanically coupled to and can communicate with the console main body 110. That is, the engaging protrusions 119 are fit into the slots 126, the display screen 114 and the buttons 122 are in the same side, the speakers 115 defined on the engaging protrusions 119 are received and shielded by the game controlling devices 120, thereby the game controlling devices 120 are engaged with the console main body 110, and players also can operate the game controlling devices 120 to control the processes of the game programs in the console main body 110. In the disassembled mode, the two controlling device 120 are detached from the console main body 110 and also can communicate with the main body 110 too. As such, the game controlling devices 120 and the console main body 110 are separate from each other, and players also can operate the game controlling devices 120 to control the processes of the game programs in the console main body 110.

Additionally, to ensure the engagement of the game controlling devices 120 and the console main body 110, a slit 1190 may be defined in each of the engaging protrusions 119, and two opposite sliding latches 1261 are slidably mounted on each of the shells 121. Therefore, the two sliding latches 1261 can slide and latch into the slit 119 in the assembled mode to latch the game controlling devices 120 and the console main body 110. Otherwise, in the disassembled mode, the two sliding latches 1261 can slide away from the slit 1190 to unlatch the game controlling devices 120 and the console main body 110, so that the game controlling devices 120 can be released from the console main body 110.

In this embodiment, the handheld game console 100 includes two game controlling devices 120, thus two hands of a player can operate two game controlling devices 120 respectively for one-player games, or two players each can operate one game controlling devices 120 to play two-player or multi-player games. It is noted that the number of the game controlling devices 120 is not limited to be two, less or more may be provided corresponding to practical need. It is also noted that the number of the engaging protrusions 119 corresponds to the number of the input operation devices 120, and the number of the speakers 115 corresponds to the number of the engaging protrusions 119.

In the present embodiment, the game controlling devices 120 can be separated from or combined with the console main body 110, thus players may feel more comfortable in hands during playing the game programs. And, the console main body 110 and the game controlling devices 120 can carry out separately, thus increase the convenience to carry about the handheld game console 100.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A handheld game console comprising:
   a console main body including a housing, a display screen, a first battery unit and a first cover, the housing including a front surface and a back surface opposite to the front surface, the display screen being provided in the front surface, a recess being defined in the back surface for receiving the first battery unit, the first cover being configured for covering the recess; and
   at least one game controlling device for inputting commands to the console main body, the at least one game controlling device being configured for selectively operating in an assembled mode where the at least one game controlling device is mechanically and communicatively coupled to the console main body, or in a disassembled mode where the at least one game controlling device is detached from the console main body and is communicatively coupled to the console main body,
   wherein the console main body has at least one engaging protrusion, and each of the at least one game controlling device defines a slot corresponding to the at least one engaging protrusion.

2. The handheld game console as claimed in claim 1, wherein the console main body comprises a central processing unit for processing the commands, the central processing unit is received in the housing.

3. The handheld game console as claimed in claim 2, wherein the console main body comprises a data storage unit electrically connected to the processing unit and received in the housing.

4. The handheld game console as claimed in claim 1, wherein the console main body comprises a speaker, the speaker is received in the at least one game controlling device in the assembled mode.

5. The handheld game console as claimed in claim 1, wherein the at least one game controlling device includes a wireless transmitter to transmit commands to the console main body, and the main body includes a wireless receiver to receive the commands transmitted from the wireless transmitter.

6. The handheld game console as claimed in claim 5, wherein the first battery unit supplies power to the wireless receiver, and the at least one game controlling device includes a second battery unit to supply power to the wireless transmitter.

7. The handheld game console as claimed in claim 1, wherein the console main body further includes two opposite side surfaces, each of the side surfaces interconnects the front and back surfaces, the at least one engaging protrusion comprises two engaging protrusions respectively extending from the two side surfaces, the at least one game controlling device comprises two game controlling devices attachable to the engaging protrusions of the console main body.

8. The handheld game console as claimed in claim 1, wherein a slit is defined in the engaging protrusion, two opposite sliding latches are slidably mounted on the game controlling device and configured to engage into the slit in the assembled mode and to disengage from the slit in the disassembled mode.

9. The handheld game console as claimed in claim 1, wherein the at least one game controlling device includes a shell and a plurality of buttons defined in a front surface of the shell, and the buttons are configured for inputting the commands.

10. The handheld game console as claimed in claim 9, wherein the buttons and the display screen, in the assembled mode, are arranged on the same side thereof.

11. The handheld game console as claimed in claim 9, wherein the shell has a recess defined in a back surface of the shell, the at least one game controlling device further includes a second cover configured for covering the recess.

12. The handheld game console as claimed in claim 11, further comprising a second battery unit received in the recess of the shell.

13. A handheld game console comprising:
- a console main body comprising a housing, a display screen, a first battery unit, a first cover, and an engaging protrusion, the housing including a front surface and a back surface opposite to the front surface, the display screen being provided in the front surface, a recess being defined in the back surface for receiving the first battery unit, the first cover being configured for covering the recess; and
- a game controlling device for inputting commands to the console main body, the game controlling device defining a slot corresponding to the engaging protrusion and being configured for selectively operating in an assembled mode where the engaging protrusion is fit into the slot and the game controlling device is communicatively coupled to the console main body, or in a dissembled mode where the game controlling device is detached from the console main body and the game controlling device is communicatively coupled to the console main body.

14. The handheld game console as claimed in claim 13, wherein the housing further includes a side surface interconnecting the front and back surfaces, and the engaging protrusion extends from the side surface.

15. The handheld game console as claimed in claim 14, wherein the console main body comprises a central processing unit for processing the commands and a data storage unit electrically connected to the processing unit, both of the central processing unit and the data storage are received in the housing.

16. The handheld game console as claimed in claim 14, wherein a speaker is defined in the engaging protrusion, and in the assembled mode, the speaker is received in the slot.

17. The handheld game console as claimed in claim 13, wherein the game controlling device includes a wireless transmitter to transmit commands to the console main body, and the main body includes a wireless receiver to receive the commands transmitted from the wireless transmitter.

18. The handheld game console as claimed in claim 13, wherein the first battery unit supplies power to the wireless receiver, and the at least one game controlling device includes a second battery unit to supply power to the wireless transmitter.

19. The handheld game console as claimed in claim 13, wherein the game controlling device includes a shell and a plurality of buttons defined in a front surface of the shell, the buttons are configured for inputting the commands, the buttons and the display screen are arranged on the same side in the assembled mode.

20. The handheld game console as claimed in claim 19, wherein a second battery unit is received in the shell.

* * * * *